Feb. 23, 1932.  W. E. MacCREEDY  1,846,343
CONTROL APPARATUS
Filed March 18, 1929
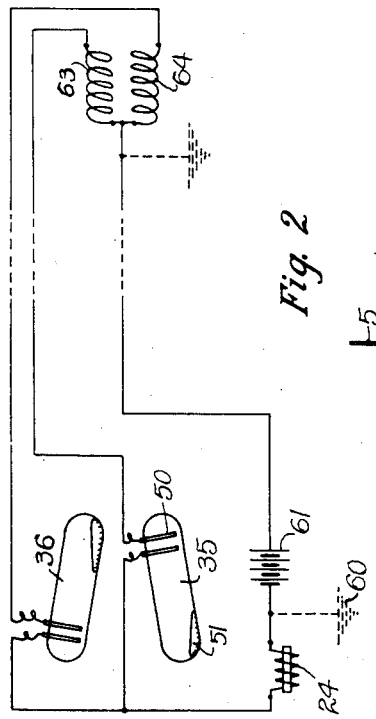
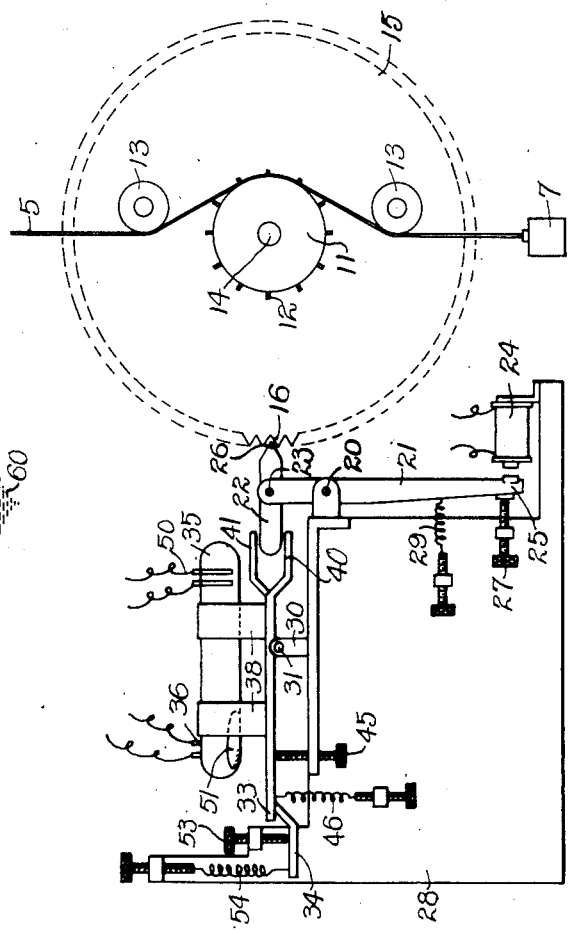
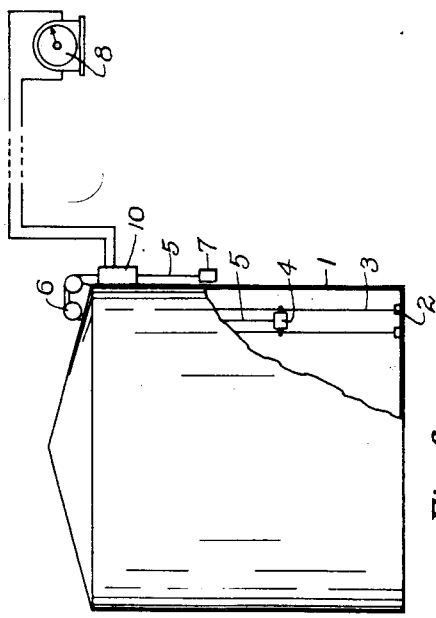
William E. MacCreedy
INVENTOR
BY Jesse R. Stone
ATTORNEY Patented Feb. 23, 1932

1,846,343

UNITED STATES PATENT OFFICE

WILLIAM E. MacCREEDY, OF HOUSTON, TEXAS, ASSIGNOR, BY DIRECT AND MESNE ASSIGNMENTS, TO INDUSTRIAL SALES COMPANY, OF HOUSTON, TEXAS, A CORPORATION OF TEXAS

CONTROL APPARATUS

Application filed March 18, 1929. Serial No. 347,964.

My invention relates to a control apparatus for transmitting impulses to an indicating mechanism and is particularly adapted for use in connection with a fluid level indicator for tanks, reservoirs, or other containers of fluid, and is constructed to operate an indicating mechanism at a remote distance from the aforesaid container.

The present invention is related somewhat to the subject matter disclosed in my co-pending application, Serial No. 318,382, filed November 10, 1928, but is in the nature of an improvement thereover.

Many devices have been conceived for use on large storage tanks, such as used for oil, water, or other fluid, in order that the fluctuation of the fluid level may be properly controlled and recorded. Objections have been found to many of these devices as it was necessary for an attendant to periodically visit the containers in order to obtain the readings and ascertain the fluid level. My prior co-pending application sets forth a complete apparatus for obtaining readings and includes an indicator to be placed remotely from the tank or reservoir.

It is one of the objects of the present application to simplify the control apparatus for use in connection with an indicator such as that disclosed in my prior application. It is to be understood, however, that the present control apparatus may be used with other types of indicators, if desired.

It is an object of my invention to provide a simplified control device in connection with a gauge for indicating the fluid level in containers.

It is also an object of my invention to provide a control device from which no sparks may be emitted during its operation.

Another object of my invention is to provide a control device wherein the electrical impulses are transmitted directly to an indicator.

Another object of the control mechanism is to transmit the variations of a gauge level into electrical impulses to operate an indicator at a remote location.

A still further object of my invention is to devise a control apparatus for receiving any variations in the gauge level of the fluid being measured.

Other and further objects of my improved and simplified apparatus will be readily apparent to those skilled in the art to which it appertains when the following description is considered in connection with the accompanying drawings, wherein:

Fig. 1 shows a side elevation assembly of my improved control apparatus in connection with the fluid level gauge.

Fig. 2 is a wiring diagram showing the connections from the control apparatus to the indicator.

Fig. 3 is a diagrammatic layout of a complete installation of my improved apparatus showing the fluid container and the indicator which may be located at a remote distance.

In order that a complete understanding of the apparatus may be had, reference is made to Fig. 3 where a fluid container, such as a storage tank, is indicated by the reference character 1. Such tanks are usually of large capacity and slight variations in the level of fluid indicate a considerable change in the volume of the contents. In order that an accurate check may be kept on the contents, a gauge arrangement, including anchors 2, guideways 3, float 4, tape 5, pulleys 6, and counter-balance 7 have been devised. A suitable scale is then placed on the side of the tank and the position of the counter-balance 7 indicates the level of the fluid in the container.

It is my aim to alter and improve the foregoing level gauge so that any variation in the level of the fluid is instantly transferred to an indicator such as 8, which may be remotely located as in the central office or any other suitable location.

I have provided a housing 10 through which the gauge tape or chain 5 is adapted to pass. The tape here used has been specially constructed by having punched or otherwise formed therein uniformly spaced openings. Fig. 1 does not show the housing but the tape 5 is indicated and it is shown as passing over a wheel 11 which has a plurality of pins 12 projecting from its periphery. These pins mesh with the openings in the tape 5, thus insuring positive movement of the wheel. A pair of idlers 13 are shown as retaining the tape in contact with the wheel. This wheel 11 is keyed or affixed to a shaft 14, which also carries a large gear 15. The shaft 14 may be of suitable length so that the wheel 11 may be placed in a separate housing and insulated from the gear 15, if desired. Any rotation of the wheel 11 by means of the tape 5 and counter weight 7 is also transmitted into a similar rotation of the gear 15. The gear 15 is preferably somewhat larger in diameter than the wheel 11 in order that a very slight movement of the tape will be magnified to represent a considerable movement of the teeth 16 which are formed on the periphery of this gear 15. Any suitable number of teeth 16 may be provided but I have contrived an arrangement wherein a change in the fluid level of ⅛ inch will cause a movement of the gear 15 at its periphery, a distance equal to the width of one of the teeth 16.

Fig. 1 also shows one type of mechanism whereby any change in fluid level is converted into electrical impluses to be transmitted to an indicator such as shown at 8. A pivot 20 is provided upon which is mounted a lever 21, which carries a dog 22 pivoted at 23. The lever 21 is shown as operated by a magnet 24. The respective lever arms on opposite sides of the pivot 20 are unequal in order that a slight movement of the end 25 adjacent the magnet 24 will result in proportional movement of the point 26 of the dog 22. It is contemplated that the movement of the lever 21 will be sufficient to withdraw the point 26 of the dog from between any two of the teeth 16 on the periphery of the gear 15. A set screw 27 is adapted to limit movement of the arm 21, which is normally withdrawn from the magnet 24 by means of a spring 29.

The pivot 20 is mounted on any suitable standard or plate support such as 28, which may be a portion of the housing 10, which supports the shaft 14. I have not included this additional structure as it would merely befog the drawings and serve no useful purpose.

The support 28 carries a standard 30 which in turn supports a pivot 31. This pivot 31 has a considerable width and is adapted to support a pair of walking beams 33 and 34, which are mounted side by side upon this pivot pin 31. Each of these walking beams is adapted to carry a mercury contact tube, such as 35, and 36. These tubes are mounted side by side so that only tube 35 is shown in the elevation of Fig. 1. These tubes are suitably supported by any desirable type of brackets, such as 38. The forward end of the walking beam 33 has an arm 40 thereon which is bent downwardly and forwardly to a position such that it will underlie the dog 22 when it is in normal or horizontal position. The walking beam 34 has a similar arm 41 which is bent upwardly and forwardly to overlie the top of the dog 22.

It will be apparent from this construction that a portion of the dog 22 is embraced from above and below between arms 40 and 41, respectively. The walking beam 33 is adapted to tilt downwardly upon downward movement of the arm 40 but is limited by a set screw 45 so that it will not tilt in the opposite direction. A spring such as 46 is adapted to resist any tilting movement of the walking beam 33. This spring 46, however, is only of sufficient strength to retain the walking beam in contact with the set screw 45 but is adapted to yield upon pivoting movement of the dog 22.

I have shown a pair of terminals 50 as entering the mercury tube 35. These terminals are spaced apart and extend to a position near the lower side of the tube, so that when the tube is tilted forwardly the globule of mercury 51 will roll forward and form a contact across the terminals 50 to complete an electrical circuit. The construction of the mercury tube, however, is well known in the art and does not constitute a portion of the present invention. When the point of the dog 26 is moved by rotation of the gear 15, due to one of the teeth 16 contacting therewith, it will be rocked about the pivot 23. If the gear 15 rotates in a clock-wise direction, the point 26 will be moved upwardly and will accordingly cause a downward movement of the arm 40. The globule 51 will then contact with the terminals 50 and complete an electrical circuit to the indicator 8.

The second mercury tube 36 is identical with the tube 35 except that its position with respect to the walking beam 34 has been reversed and the contacts 50 are placed at the rearward end. When the dog 22 it tilted upwardly it will contact the arm 41 and cause a contact to be formed through the circuit of the tube 36. A set screw 53 and spring 54 control and limit the movement of the walking beam 34 the same as the set screw 45 and spring 46 control the movement of the walking beam 33.

The wiring diagram of Fig. 2 shows the tubes 35 and 36 both in a position so that the mercury is out of contact with the terminal. The magnet 24 is shown in the circuits of both of these mercury tubes, the circuit being grounded at 60, and current is shown as being supplied by means of a battery 61. This current, however, may be supplied from any suitable source of electricity such as the supply line from a city or other source. The tube 35 is shown as wired to send an impulse into the coil 63, which may represent the magnet in an indicator such as 8. This coil 63 may serve to operate any suitable lever mechanism in the indicator to indicate or record a change of fluid level in the container, which is represented by the rotation of the gear 15 through a distance of one of the teeth 16. A second coil 64 is shown as receiving the impulse from the tube 36 which also operates a mechanism similar to that just described for the coil 63, but obviously the impulse from 64 is the reverse of that indicated by an impulse to the coil 63. The tube 35 and coil 63 may be said to record positive impulses while the tube 36 and coil 64 may be designated as negative.

The operation of the control device is as follows:

Upon any change in fluid level in the container 1, the float 4 is moved a distance corresponding to the fluctuation in fluid level. This movement of the float 4 raises or lowers the counter weight 7 and causes a vertical movement of the tape 5. For purposes of illustration we will assume that this movement was an increase in the fluid pressure which therefore raised the float 4 and lowered the counter weight 7, causing the wheel 11 and gear 15 to rotate in a clock-wise direction. This rotation in a clock-wise direction caused the tooth 16 immediately below the point 26 of the dog 22 to contact with the point and raise it upwardly. Inasmuch as the dog 22 is pivoted at 23 the opposite end moves downward to contact the arm 40 whereby the mercury globule 50 rolls forward by gravity to complete the circuit across the terminals 50. An electrical impulse is therefore transmitted to the coil 63 and as the magnet 24 is wired in this circuit an impulse is conveyed thereto. This impulse draws the end 25 of the lever 21 over to the magnet and withdraws the dog 22 from its position against the upper surface of the tooth 16. The tension on the spring 46 tending to raise the arm 40 instantly pivots the dog 22 to a position below the tooth 16. As the tension on the dog 22 is thus relieved the spring 46 pivots the dog 22 back to a horizontal position and also rocks the mercury tube 35 to a position so that the globule 51 rolls away from the contacts 50 and breaks the circuit. When the circuit is thus broken the current is cut off from the magnet 24 and the point 26 due to the spring 29 is instantly inserted between the tooth 16 just passed and the next succeeding tooth.

The impulse which passed to the coil 63 of the indicator recorded or indicated a change of fluid level represented by the rotation of the gear 15 through a distance equal to one of the teeth 16. It is obvious that the movement of one of the teeth 16 may be arranged to indicate a change of fluid level of any desired amount in the container or may be represented to indicate a change of any desired volume.

The operation of the tube 36 is identical with that of the tube 35 just described except that it is operated only when the gear 15 rotates in a counter clock-wise direction which is here arranged to indicate a drop in fluid level in the tank 1. The impulse conveyed to the coil 64 either records the change in fluid level or otherwise indicates the reverse of the coil 63.

I believe that the foregoing description sets forth an embodiment of the device which is satisfactory and practical for the purposes in view, but I do not desire to be limited to the precise construction, except insofar as recited in the appended claims as obviously slight alterations may be made in the device to adapt it for application to the various types of installation which may be necessary.

Having described my invention, what I claim as new is:

1. In combination a fluid level gauge, an indicator to designate the changes in the gauge, and a control means actuated by said gauge to operate said indicator, said control means including a toothed wheel and a pivoted pointed dog, normally engaging said wheel, a pair of tiltable walking beams adapted to engage said dog on opposite sides thereof, a mercury contact tube mounted upon each walking beam, said tubes being reversely positioned with respect to each other, an electrical circuit connecting each tube with said indicator, an electromagnetic means to laterally move said dog away from said wheel including a magnet disposed in both of said tube circuits.

2. In combination a fluid level gauge, an indicator to designate the changes in the gauge, and a control means actuated by said gauge to operate said indicator, said control means including a pivoted dog and a movable member having dog actuating projections, a pair of tiltable walking beams adapted to engage said dog on opposite sides thereof, a mercury contact tube mounted upon each walking beam, said tubes being reversely positioned with respect to each other, an electrical circuit connecting each tube with said indicator, an electromagnetic means to laterally move said dog away from said movable member including a magnet disposed in both of said tube circuits, whereby an electrical impulse is transmitted to said indicator and said magnet.

3. In a device of the character described including a pivoted dog, and a movable member having dog actuating projections, a pair of oppositely tiltable electrical contact means, adapted to engage said dog on opposite sides thereof, means for mounting said dog for lateral as well as pivotal movement, and means to instantly return said contact means to its open circuit position upon the making of the contact.

4. In a device of the character described including a pair of walking beams, a mercury contact tube mounted on each of said beams, a dog, means for mounting said dog for lateral as well as pivotal movement, a movable member having dog actuating projections whereby said dog is pivoted to tilt either of said beams and is movable laterally into and out of engagement with said movable member, and means including a magnet wired into the circuits of said tubes and energized on contact of either of said tubes to laterally withdraw said dog from engagement with said movable member.

5. In a telemetric system an impulse transmitter including a toothed gear, a pointed dog normally positioned with its point between the teeth on said gear, a pair of mercury contact tubes disposed on said transmitter and adapted to be actuated by movement of said dog, a pivotal support for said dog, means responsive to an impulse contact of said tubes to move the pivot point of said dog momentarily away from said gear, and spring means to return said tubes and said support to normal position.

6. In a fluid level gauge, a base, a wheel having a toothed periphery, means for mounting said wheel on the base including a horizontally disposed axle, a pointed dog, means for pivotally mounting said dog in a normally horizontal position including a vertical lever pivoted on said base, spring means associated with said vertical lever for normally biasing said dog into engagement with the periphery of said wheel, an electromagnet mounted adjacent said vertical lever whereby said bias may be overcome, a pair of walking beams, means pivotally mounting said walking beams horizontally in said base, said beams being provided with means respectively engaging upper and lower faces of said dog, and mercury switches horizontally disposed on each of said walking beams.

In testimony whereof I hereunto affix my signature this 1st day of March, A. D. 1929.

WILLIAM E. MacCREEDY.